US012793920B2

(12) United States Patent
Amelio

(10) Patent No.: US 12,793,920 B2
(45) Date of Patent: Nov. 10, 2026

(54) SWITCHING DEVICE

(71) Applicant: Microtest S.p.A., Vicopisano (IT)

(72) Inventor: Giuseppe Amelio, San Pietro (IT)

(73) Assignee: Microtest S.p.A., Vicopisano (IT)

( * ) Notice: Subject to any disclaimer, the term of this patent is extended or adjusted under 35 U.S.C. 154(b) by 212 days.

(21) Appl. No.: 18/735,530

(22) Filed: Jun. 6, 2024

(65) Prior Publication Data

US 2024/0412934 A1 Dec. 12, 2024

(30) Foreign Application Priority Data

Jun. 9, 2023 (IT) ........................ 102023000011838

(51) Int. Cl.

*H01H 50/54* (2006.01)
*H01H 50/02* (2006.01)
*H01H 50/14* (2006.01)
*H01H 50/18* (2006.01)

(52) U.S. Cl.

CPC ............ *H01H 50/54* (2013.01); *H01H 50/02* (2013.01); *H01H 50/14* (2013.01); *H01H 50/18* (2013.01)

(58) Field of Classification Search

CPC ........ H01H 50/54; H01H 50/02; H01H 50/14; H01H 50/18; H01H 1/20; H01H 1/24; H01H 9/0066; H01H 9/167; H01H 3/24

See application file for complete search history.

(56) References Cited

U.S. PATENT DOCUMENTS 5,267,120 A 11/1993 Graff et al.

FOREIGN PATENT DOCUMENTS

| | | | | |
|---|---|---|---|---|
| EP | 2442342 | A2 * | 4/2012 | ........... H01H 50/305 |
| EP | 3477677 | A1 | 5/2019 | |
| SU | 1278494 | A1 * | 12/1986 | |

OTHER PUBLICATIONS

Search Report issued on Nov. 20, 2023, in corresponding Italian Application No. 102023000011838; 3 pages Machine-translation of Category of Documents Cited attached.

* cited by examiner

*Primary Examiner* — Mohamad A Musleh
(74) *Attorney, Agent, or Firm* — Maier & Maier, PLLC

(57) ABSTRACT

A switching device including at least one first terminal and at least one second terminal, at least one actuation unit including an electrovalve and an actuator which is integral with a contact plate which is able to move from a first position, in which it is in contact with both the at least one first terminal and the at least one second terminal thereby bringing them into electrical contact, to a second end stroke position, in which it is offset from the at least one first terminal and at least one second terminal, where the electrovalve is arranged to command the actuator, thereby moving the contact plate between the first end stroke position and the second end stroke position, the at least one first terminal and at least one second terminal including retractable electrical contacts which are retractable within a respective housing against the action of an elastic element.

9 Claims, 8 Drawing Sheets

SWITCHING DEVICE

The present invention relates to a switching device, in particular a relay.

FIELD

More in detail, the invention regards a relay of the said type, which is studied and in particular made to carry out a high number of switchings, mainly used in circuit diagnostic devices, but which can be also used for any application that requires a very good commutation capability.

Hereafter, the description will refer to a relay employed in circuit diagnostic devices, but it is obvious that it should not be considered limited to this specific use.

BACKGROUND

It is well known that relays are electrical components whose operation occurs by means of an electromagnet consisting of a coil of electric conductive wire which is wound around a core made of ferromagnetic material.

When the electric current passes through the coil, which is commanded by means of an electric command signal, the electromagnet attracts the armature to which the movable contact is constrained, which therefore changes position.

Usually, known relays may have several contacts, generally three contacts, in particular one movable and two fixed contacts.

When the relay is at rest, the movable contact is in contact with one of the two fixed contacts.

When the relay is activated, i.e. when electric current passes through the coil, the movable contact moves onto the other contact.

At present, known relays have closing times and thus switching frequency that depend on the movement of the components and are thus subject to mechanical wear, in addition to being sensitive to vibrations.

Moreover, the metallic contacts are subject to the drawbacks related to the oxidation thereof.

SUMMARY

In light of the above, a purpose of the present invention is thus to overcome the drawbacks of the prior art.

Another purpose of the invention is to provide a device having a high switching frequency.

A further purpose of the present invention is to provide a device that can be activated by means of different activation sources compared to the prior art.

Another purpose of the present invention is to provide a device comprising components made of stable material.

Thus, a specific object of the present invention is a switching device comprising at least one first terminal and at least one second terminal, at least one actuation unit comprising an electrovalve and an actuator which is integral with a contact plate which is able to move from a first position, in which it is in contact with both said at least one first terminal and said at least one second terminal thereby bringing them into electrical contact, to a second end stroke position, in which it is offset from said at least one first terminal and at least one second terminal, wherein said electrovalve is arranged to command said actuator thereby moving said contact plate between said first end stroke position and said second end stroke position, said at least one first terminal and at least one second terminal comprising retractable electrical contacts which are retractable within a respective housing against the action of an elastic element.

Further according to the invention, said actuator comprises a movable piston which is movable in a cylinder and connected through a rod to a front plate which carries said contact plate.

Again according to the invention, said actuator comprises a spring acting on said movable piston opposite with respect to the movement of said movable piston commanded by said electrovalve.

According to the invention, said actuation unit is preferably of the pneumatic type.

Again according to the invention, said first terminal, said second terminal and said contact plate define a main circuit, said switching device further comprising a diagnostic circuit designated to detect the correct opening and closing conditions of the main circuit.

Further according to the invention, said diagnostic circuit comprises a first pair of interface contacts which are accessible from the outside of a casing of the switching device, the diagnostic circuit being configured to short-circuit the first pair of interface contacts only when the main circuit is in an open configuration with the front plate in the corresponding first end stroke position.

Again according to the invention, the contacts of the first pair of interface contacts are connected two by two with the contacts of a second pair of interface contacts, said second pair of interface contacts internally facing the chamber in which the front plate runs, said front plate comprising at least one conductive portion which comes into contact with the second pair of interface contacts, thus short-circuiting it, when said front plate reaches the first end stroke position.

According to the invention, said diagnostic circuit preferably comprises a third pair of interface contacts which are accessible from the outside of a casing of the switching device, the diagnostic circuit being configured to short-circuit the third pair of interface contacts, only when the main circuit is in a closed configuration with the front plate in the corresponding second end stroke position.

Again according to the invention, said front plate comprises at least one conductive portion which comes into contact with the third pair of interface contacts, thus short-circuiting it, when said front plate reaches the second end stroke position.

Further according to the invention, during the movement of the front plate from a first end stroke position towards said second end stroke position, the contact plate reaches the retractable electrical contacts of the first and second terminals before the at least one conductive portion reaches the third pair of interface contacts.

Again according to the invention, the at least one conductive portion is made in a single conductive body which crosses the entire thickness of the front plate.

BRIEF DESCRIPTION OF THE FIGURES

The present invention will now be described by way of non-limiting illustration, according to its preferred embodiments, with particular reference to the figures of the attached drawings, in which.

DETAILED DESCRIPTION

Figure 1:
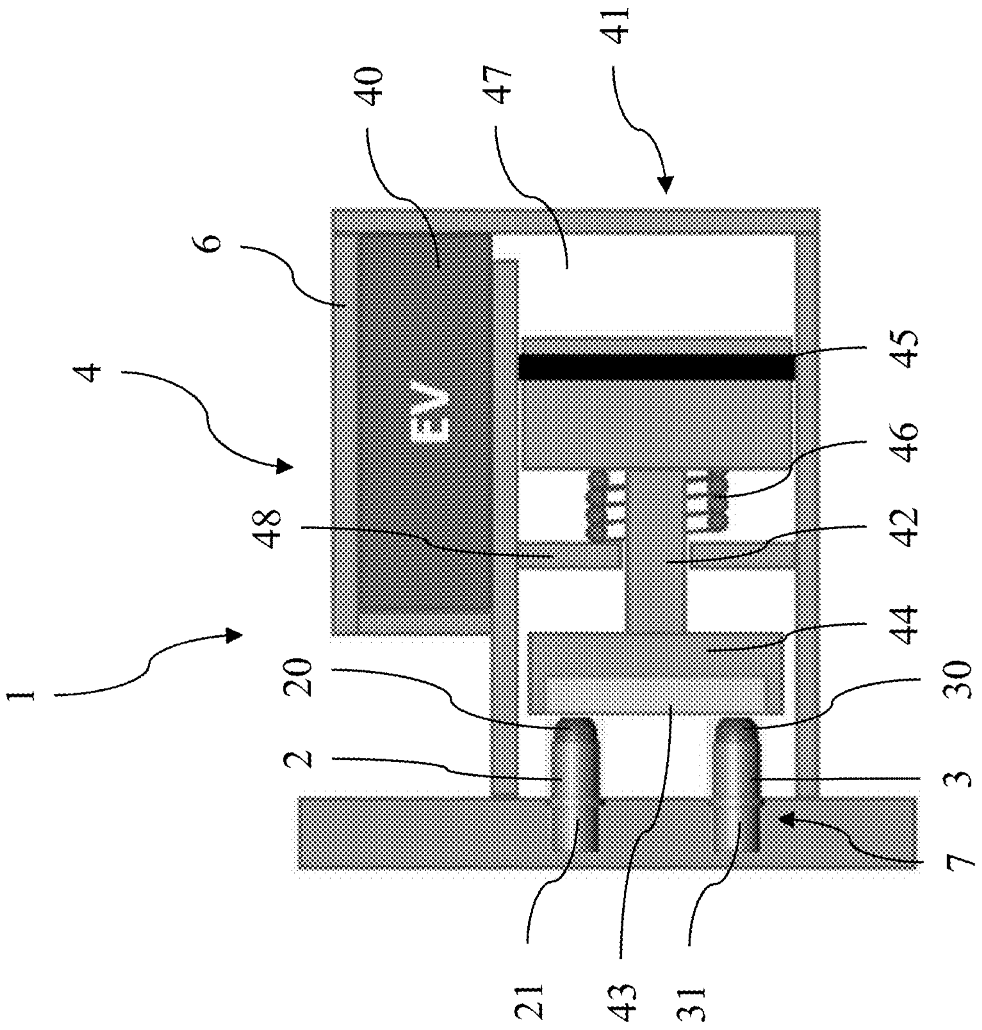
FIG. 1 shows a schematic sectional side view of the switching device that is the object the present invention, in a first state.
Figure 2:
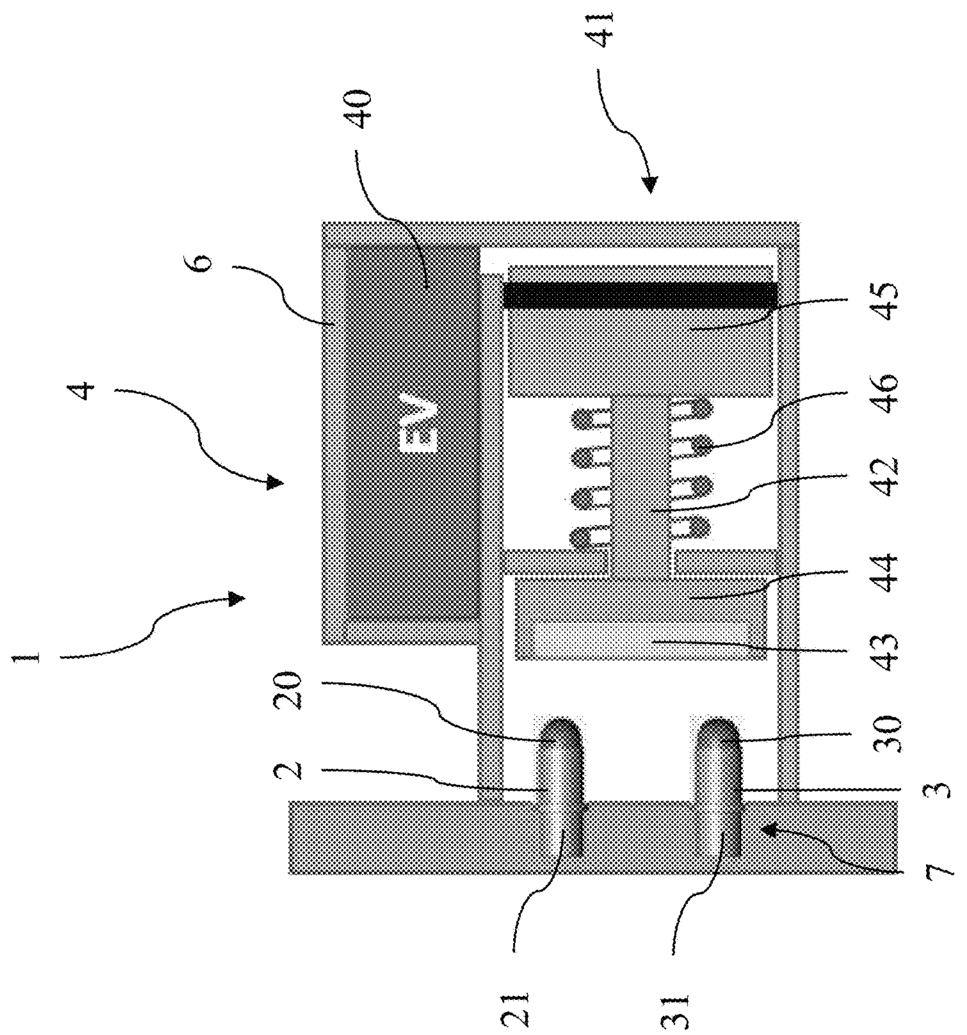
FIG. 2 shows a schematic sectional side view of the device shown in FIG. 1, in a second state.
Figure 3:
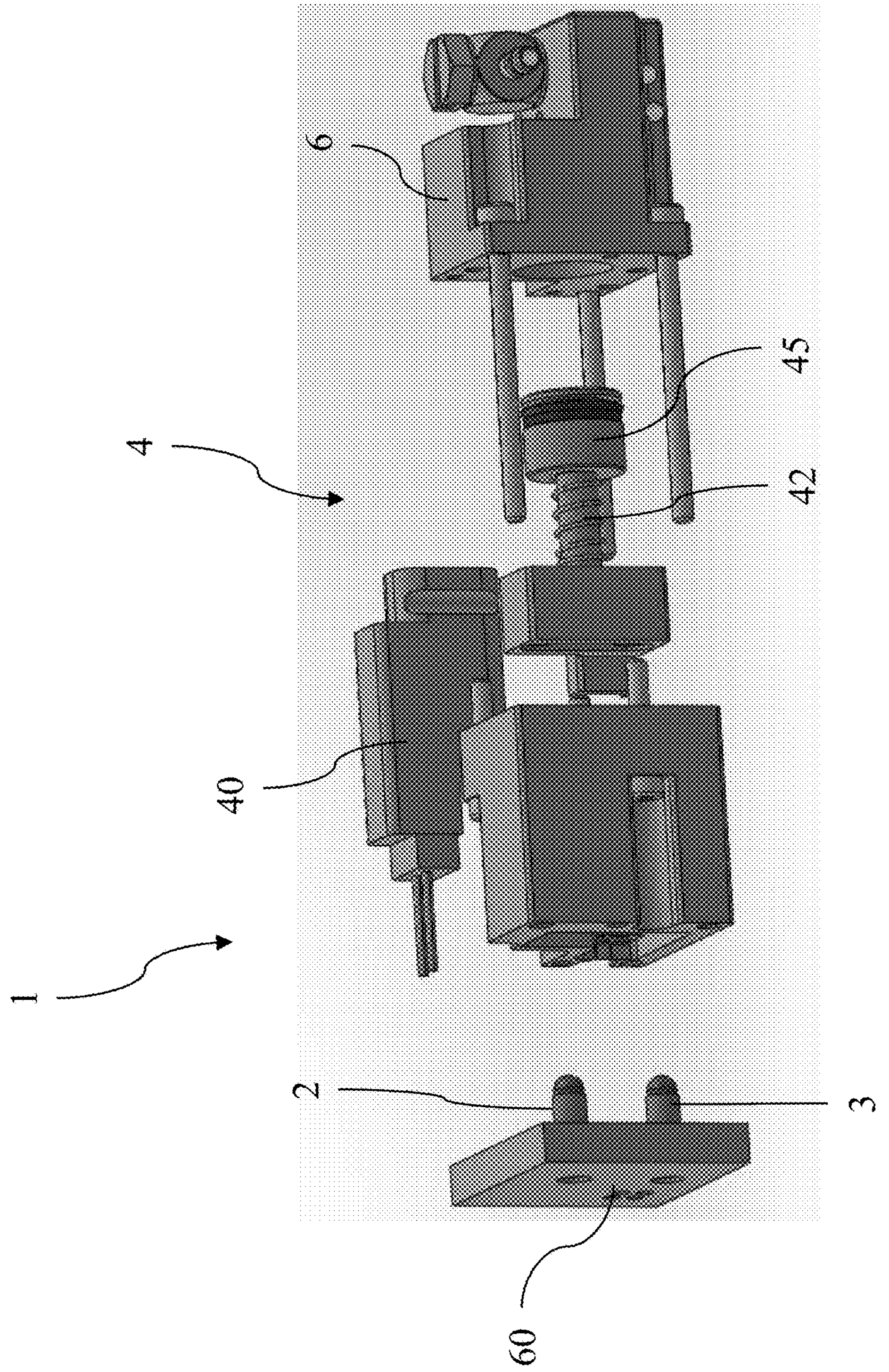
FIG. 3 shows an exploded view of the switching device that is the object of the present invention.
Figure 4:
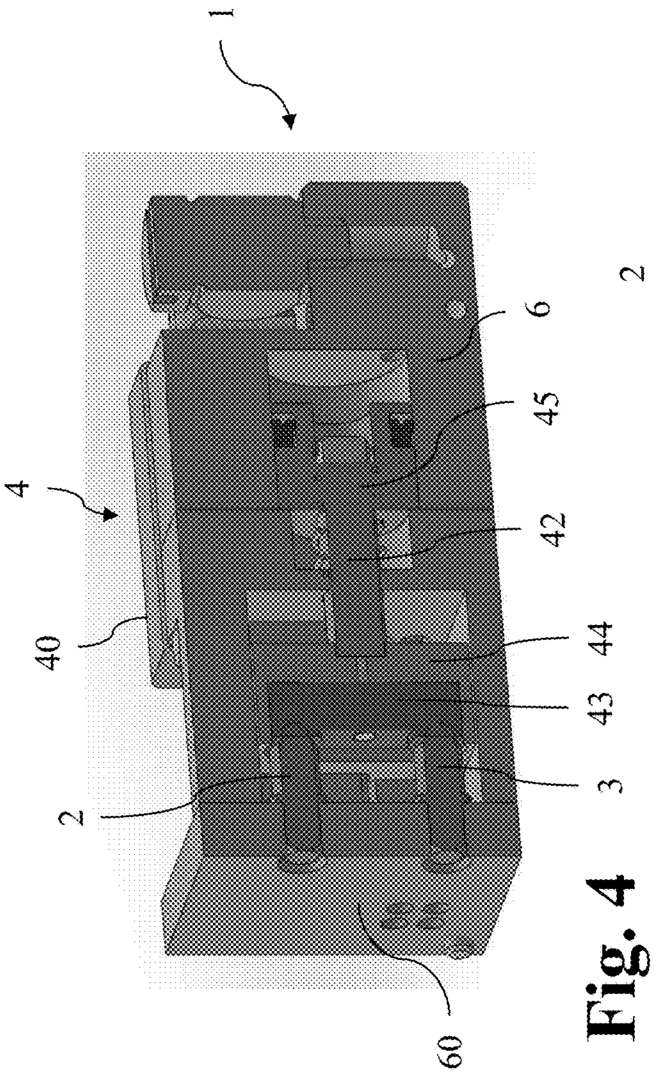
FIG. 4 shows an axonometric view of a section of the switching device that is the object the present invention.
Figure 5:
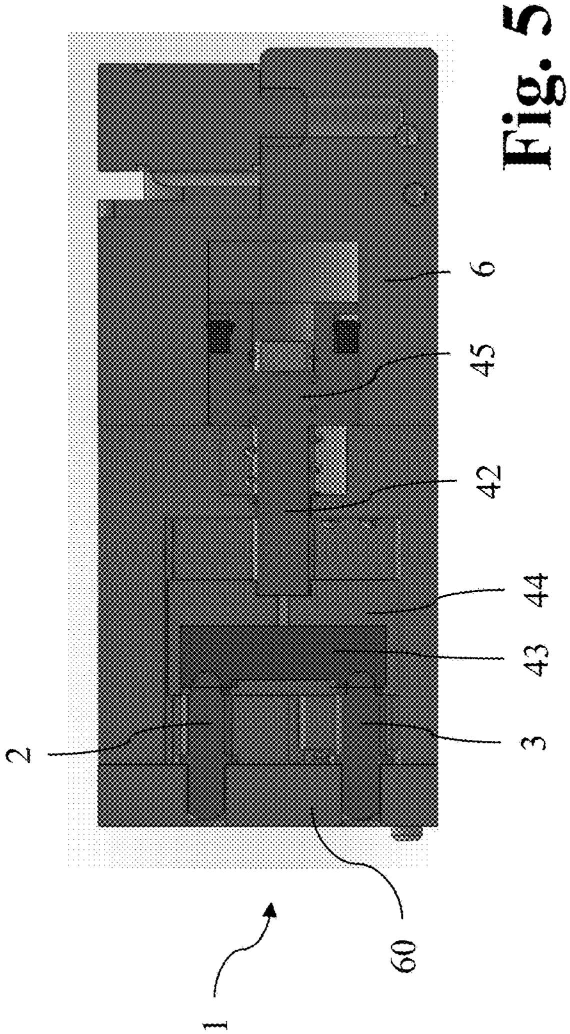
FIG. 5 shows a front view of the device shown in FIG. 4.
Figure 6:
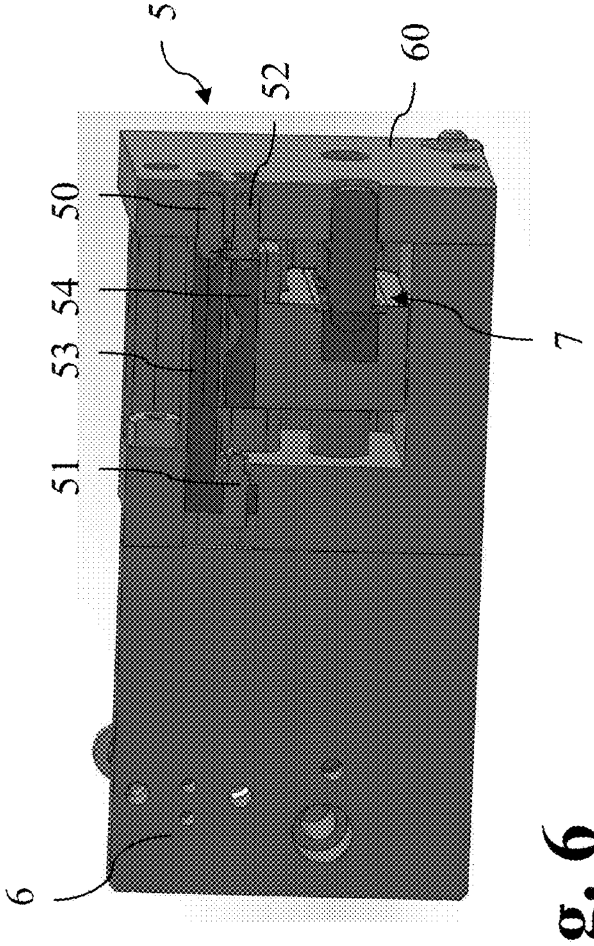
FIG. 6 shows a further axonometric view of a section of the switching device that is the object the present invention, in a first state.
Figure 7:
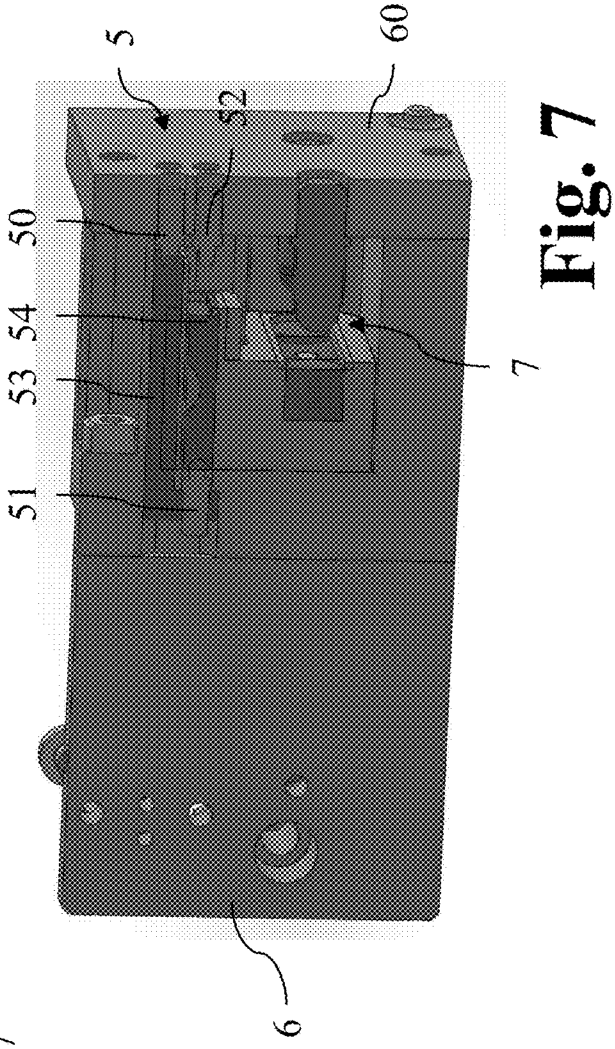
FIG. 7 shows a front view of the device shown in FIG. 6, in a second state.
Figure 8:
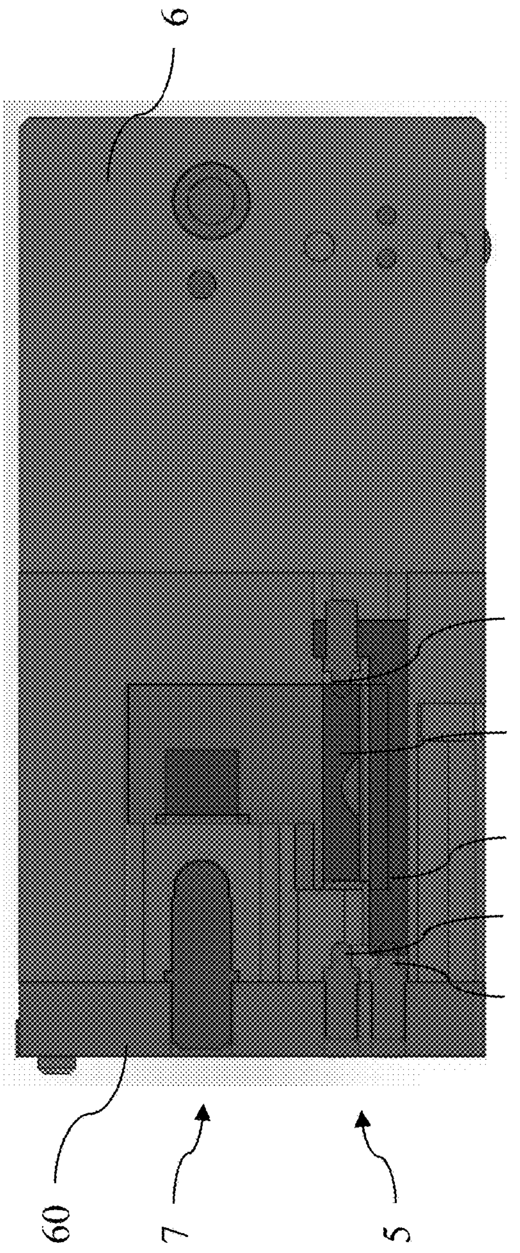
FIG. 8 shows a front view of a section of a part of the switching device that is the object the present invention, in a first state.
Figure 9:
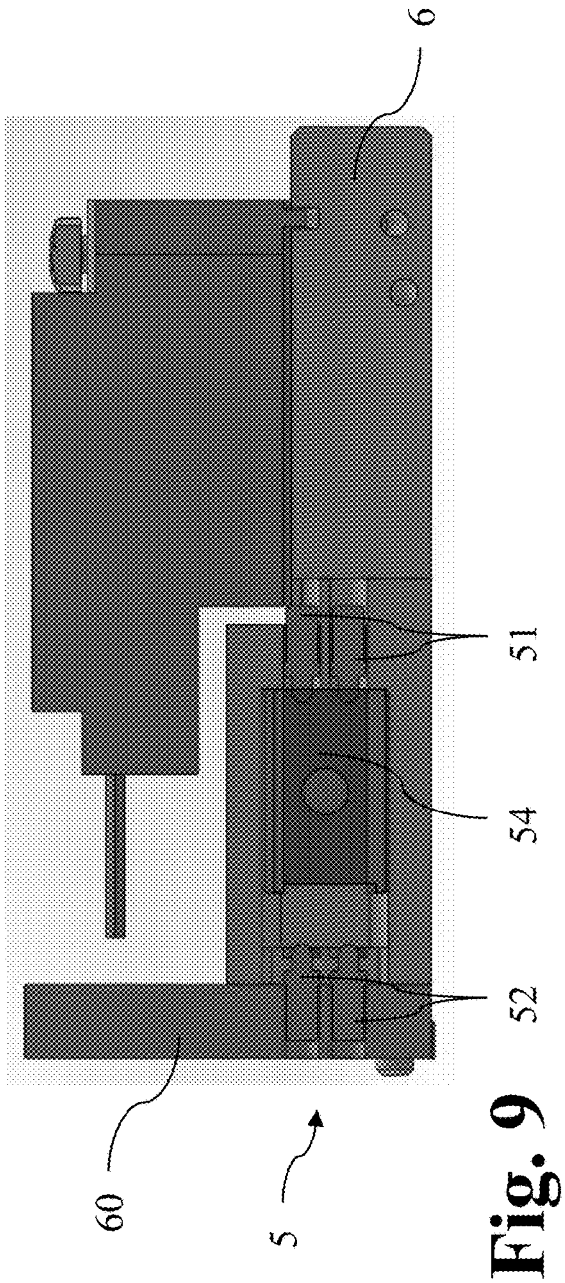
FIG. 9 shows a further front view of a section of a further part of the switching device that is the object the present invention, in a first state.
Figure 10:
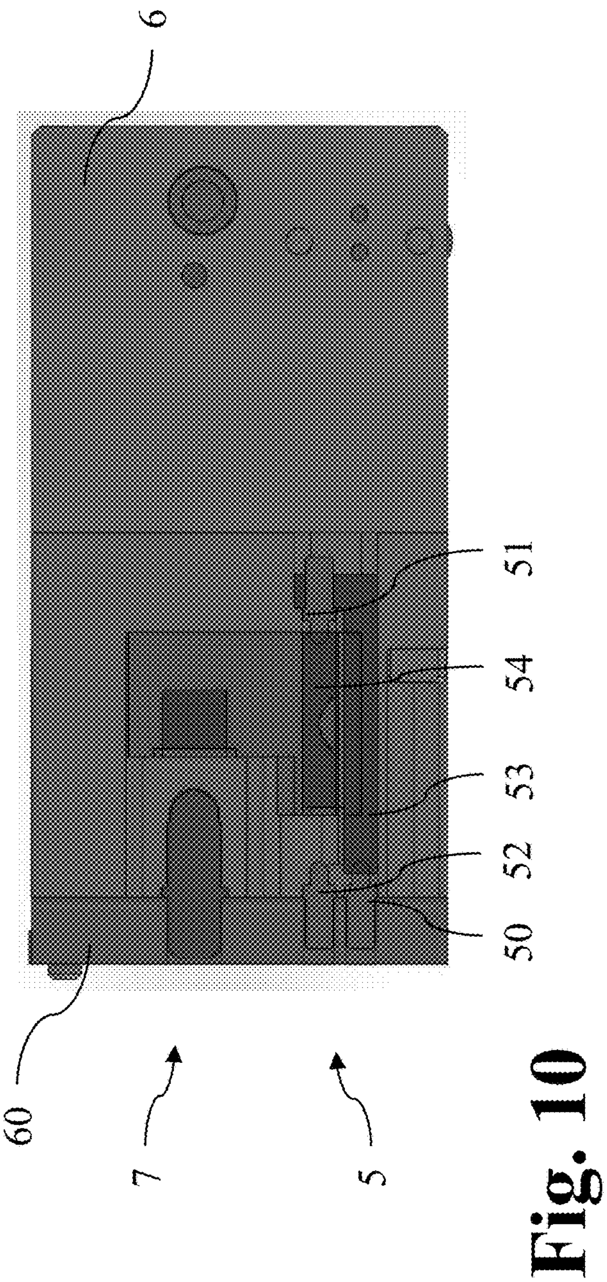
FIG. 10 shows a front view of a section of the switching device that is the object the present invention, in an open state.
Figure 11:
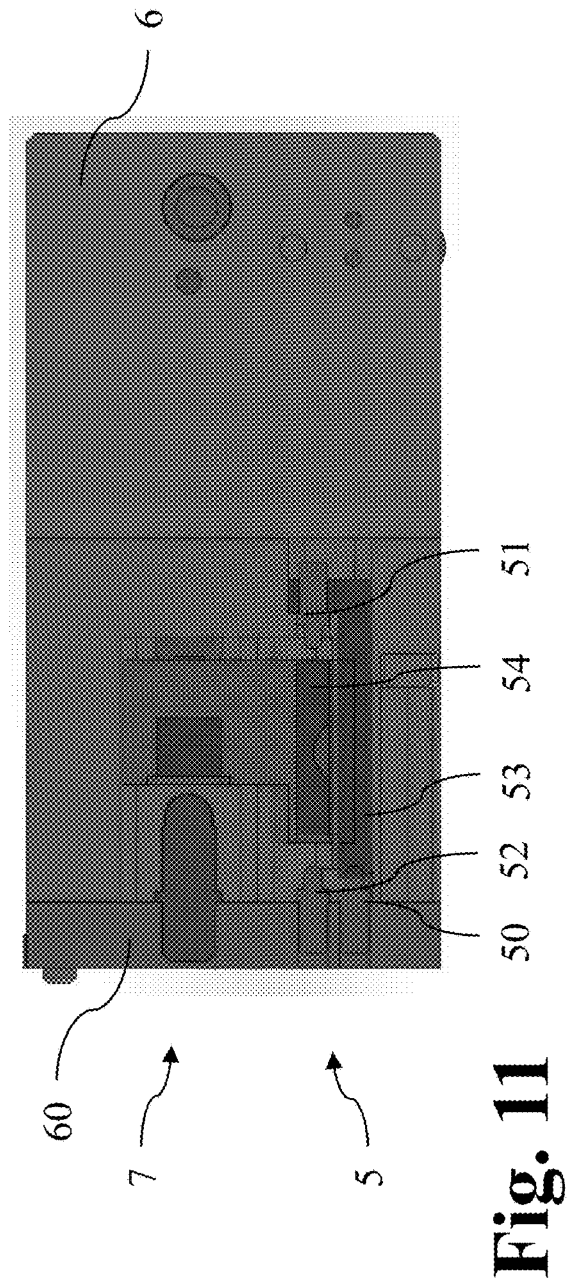
FIG. 11 shows a front view of the device shown in FIG. 10, in a first uncertain state.
Figure 12:
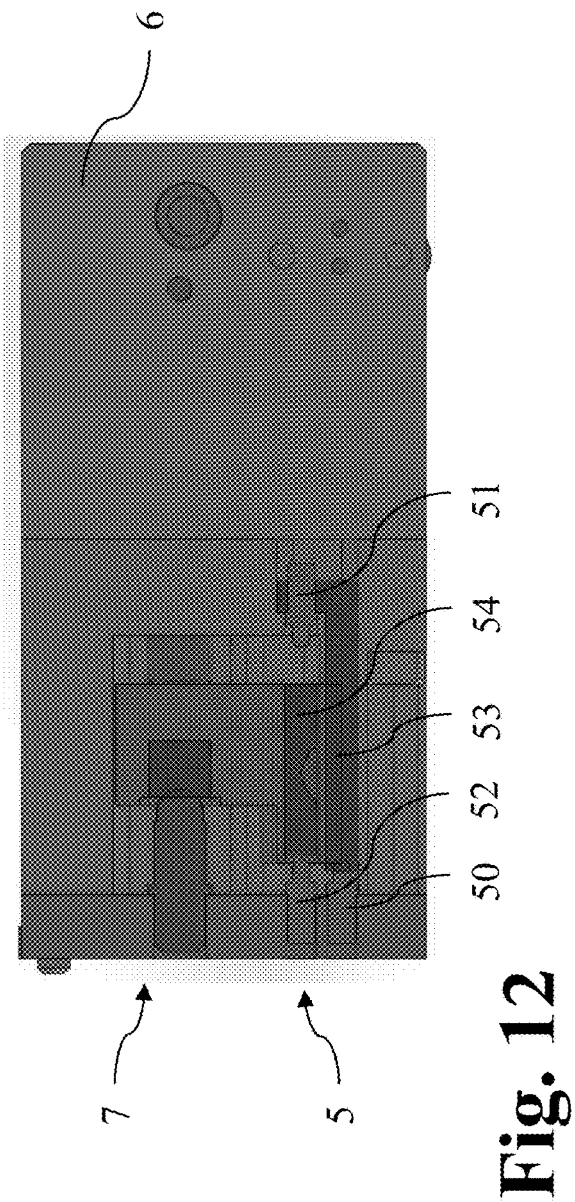
FIG. 12 shows a front view of the device shown in FIG. 10, in a second uncertain state.
Figure 13:
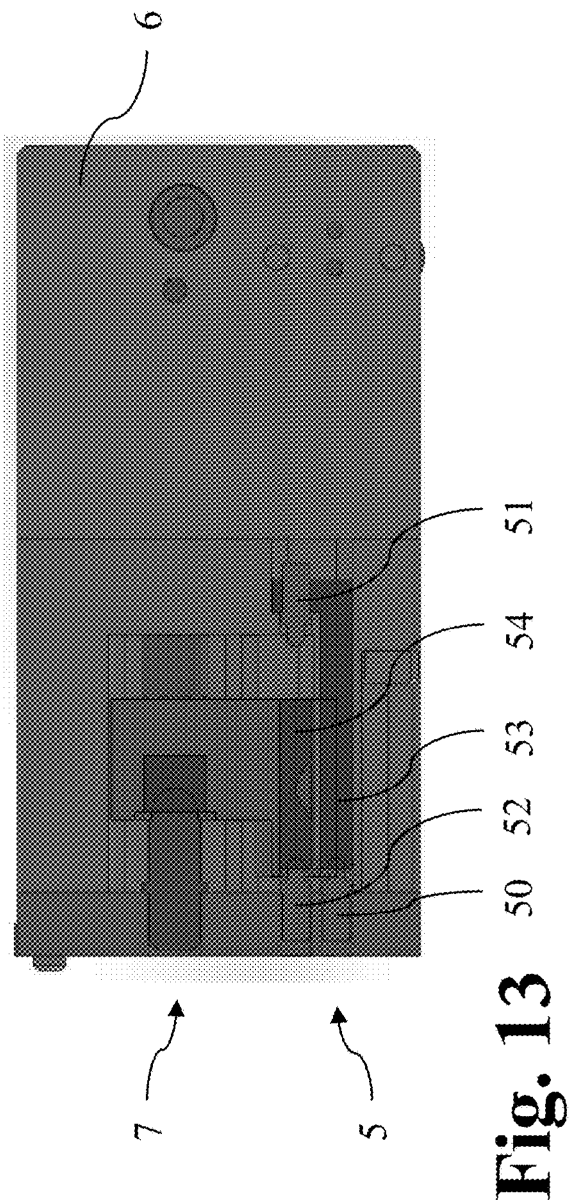
FIG. 13 shows a front view of the device shown in FIG. 10, in a closing state.

In the various figures, similar parts will be indicated by the same reference numerals.

Referring to FIG. 1, the switching device 1 that is the object of the present invention essentially comprises a casing 6, a first terminal 2, a second terminal 3, an actuation unit 4 and a diagnostic circuit 5.

In particular, said switching device 1 is a SPST (single pole, single throw) relay that is used for high-intensity voltages and currents and is able to carry out a high number of switchings.

Said casing 6 is made of a material of the PEEK-Polyether Ether Ketone-type, which is highly insulating.

Said first terminal 2 and second terminal 3 are in particular similar to the devices that are commercially known as pogo pin.

Usually, a pogo pin is a spring-loaded pin, comprising a plunger, a barrel housing and a spring.

When force is applied to the pin, the spring is compressed and the plunger moves inside the housing.

The barrel shape of the housing holds the plunger, thereby preventing the spring to push it out when the pin is not locked into position.

Said actuation unit 4 comprises an electrovalve 40 and a pneumatic actuator 41.

Said electrovalve 40 is integrated at a minimum distance from said pneumatic actuator 41.

Said pneumatic actuator 41 moves a contact plate 43 able to move from a first end stroke position, in which said contact plate is in contact with both said at least one first terminal 2 and with said at least one second terminal 3 thereby bringing them into electrical contact, to a second end stroke position, in which the contact plate 43 is offset from the first terminal 2 and from the second terminal 3.

Said first terminal 2, second terminal 3 and said contact plate 43 define a main circuit 7.

In particular, said actuator 41 comprises a movable piston 45 movable in a cylinder 47 and connected through a rod 42 to a front plate 44 which carries said contact plate 43.

Said cylinder 47 is separated into two portions by means of a partition 48 which separates the stroke of the movable piston 45 from the stroke of the front plate 44.

Moreover, said actuator 41 comprises a spring 46 acting on said movable piston 45 opposite with respect to the movement of said movable piston 45 commanded by said electrovalve 40, thereby defining a single-acting actuator configuration.

Said electrovalve 40 is arranged to command said actuator 41 thereby moving said contact plate 43 between said first end stroke position and said second end stroke position.

Said first terminal 2 and second terminal 3 comprise retractable electrical contacts 20, 30 which are retractable within a respective housing 21, 31 against the action of an elastic element.

Said diagnostic circuit 5 is capable of verifying in which state is the switching device 1, so as to prevent a damaging electrical stress.

In particular, said diagnostic circuit 5 comprises a first pair of interface contacts 50, a second pair of interface contacts 51, and a third pair of interface contacts 52.

Said first 50 and second 51 pair of interface contacts are able to detect the open-circuit condition of the main circuit 7, whereas said third pair of interface contacts 52 is able to detect the closed-circuit condition.

Said first 50 and third 52 pair of interface contacts externally face said casing 6, in particular a bottom 60, onto which the first 2 and the second 3 terminal of said main circuit 7 face.

Said second pair 51 is arranged inside said casing 6, in particular, it faces the portion of the cylinder 47 downstream said partition 48, opposite the first 50 and the third 52 pair of interface contacts.

Said pairs of contacts 50-52, similarly to the contacts of said main circuit 7, are contacts which are retractable within a respective fixed case and are maintained in the extracted position by an internal counteracting spring.

Said second 51 and third 52 pair of interface contacts both interfere with the stroke of the front plate 44, in particular of a lateral portion 49 of said front plate 44. In the preferred embodiment, which is shown herein, said lateral portion 49 has an increased thickness compared to the rest of the front plate 44.

Instead, said first pair of contacts 50 is arranged in a position which is offset from the cylinder 47 in which the front plate 44 slides.

The contacts of said first 50 and second 51 pair of contacts are connected two by two by a pair of connectors 53 which crosses the casing 6.

At least one conductive portion 54, configured to short-circuit the two connectors of the second pair 51 or the two connectors of the third pair 52 as appropriate, is provided in the lateral portion 49 of the front plate 44.

In a preferred, very advantageous embodiment, said at least one conductive portion 54 consists of a single conductive body which crosses the entire thickness of the lateral portion 49.

The switching device 1 described above functions as follows.

When the switching device 1 is activated, said actuation unit 4 moves said contact plate 43, thereby activating or deactivating said main circuit 7.

In particular, said electrovalve 40 commands said actuator 41 thereby moving said contact plate 43 between said second end stroke position and said first end stroke position;

the spring 46 then allows the front plate 44 to return to the second end stroke position when the action of the actuator 41 ends.

In said first end stroke position, said contact plate 43 is in contact with said first 2 and second 3 terminal, thereby activating said main circuit 7.

In said second end stroke position, said contact plate 43 is offset from said first 2 and second 3 terminal, because said spring 46 extends, thus retracting said contact plate 43, thereby deactivating said main circuit 7.

Said diagnostic circuit 5 is able to detect the correct opening and closing conditions of the main circuit 7.

Said main circuit 7 may be in an open position, in a first uncertain position, in a second uncertain position and in a closed position. The first uncertain position is a position in which the main circuit 7 is open, but the front plate is stationary in an intermediate position, without reaching the second end stroke position. Similarly, the second uncertain position is a position in which the main circuit 7 is closed, but the front plate 44 has not reached the first end stroke position: in other words, the retractable electrical contacts 20, 30 come into contact with the contact plate 43, but the front plate 44 does not push them to the end of their housing 21, 31.

To carry out the above-mentioned diagnostics, said conductive portion 54 short-circuits said second pair of interface contacts 51 only when the main circuit is in open configuration with the front plate 44 in a corresponding first end stroke position. Then, by reading the signal coming from the pair of first interface contacts 50, in electrical connection with the second contacts 51, a positive result is obtained only in the case of correct opening of the main circuit 7.

On the contrary, the opposite end of the same conductive portion 54 comes into contact with the third pair of interface contacts 52, thus short-circuiting it, when said front plate 44 reaches the first end stroke position. Then, by reading the signal coming from the pair of third interface contacts 52, a positive result is obtained only in the case of correct closing of the main circuit 7.

Moreover, during the movement of the front plate 41 from the first end stroke position towards said second end stroke position, the contact plate 43 reaches the retractable electrical contacts 20, 30 of the first 2 and second 3 terminals, before said conductive portion 54 reaches the third pair of interface contacts 52. Therefore, the third pair of interface contacts 52 is not automatically short-circuited upon closing the main circuit 7, thereby allowing to identify situations attributable to the above-mentioned second uncertain position.

As is evident from the above description, the switching device, which is object of the present invention, is able to carry out a high number of switchings in the presence of high voltage and current values, due to the presence of an actuator of the pneumatic type and of terminals having a retractable pin.

The present invention has been described by way of non-limiting illustration, according to its preferred embodiments, but it is to be understood that variations and/or modifications can be made by those skilled in the art without departing from the relative scope of the invention, as defined in the appended claims.

The invention claimed is:

1. A switching device comprising at least one first terminal and at least one second terminal, at least one actuation unit comprising an electrovalve and an actuator which is integral with a contact plate which is able to move from a first position, in which it is in contact with both said at least one first terminal and said at least one second terminal thereby bringing them into electrical contact, to a second end stroke position, in which it is offset from said at least one first terminal and at least one second terminal, wherein said electrovalve is arranged to command said actuator thereby moving said contact plate between said first end stroke position and said second end stroke position, said at least one first terminal and at least one second terminal comprising retractable electrical contacts which are retractable within a respective housing against the action of an elastic element; wherein said first terminal, said second terminal and said contact plate define a main circuit, said switching device further comprising a diagnostic circuit designated to detect the correct opening and closing conditions of the main circuit; wherein said diagnostic circuit comprises a first pair of interface contacts which are accessible from the outside of a casing of the switching device, the diagnostic circuit being configured to short-circuit the first pair of interface contacts only when the main circuit is in an open configuration with the front plate in the corresponding first end stroke position.

2. The switching device according to claim 1, wherein said actuator comprises a movable piston movable in a cylinder and connected through a rod to a front plate which carries said contact plate.

3. The switching device according to claim 2, wherein said actuator comprises a spring acting on said movable piston opposite with respect to the movement of said movable piston commanded by said electrovalve.

4. The switching device according to claim 1, wherein said actuation unit is of the pneumatic type.

5. The switching device according to claim 1, wherein the contacts of the first pair of interface contacts are connected two by two with the contacts of a second pair of interface contacts, said second pair of interface contacts internally facing the chamber in which the front plate runs, said front plate comprising at least one conductive portion which comes into contact with the second pair of interface contacts, thus short-circuiting it, when said front plate reaches the first end stroke position.

6. The switching device according to claim 5, wherein said diagnostic circuit comprises a third pair of interface contacts which are accessible from the outside of a casing of the switching device, the diagnostic circuit being configured to short-circuit the third pair of interface contacts only when the main circuit is in a closed configuration with the front plate in the corresponding second end stroke position; wherein said front plate comprises at least one conductive portion which comes into contact with the third pair of interface contacts, thus short-circuiting it, when said front plate reaches the second end stroke position; wherein the at least one conductive portion is made in a single conductive body which crosses the entire thickness of the front plate wherein said diagnostic circuit comprises a third pair of interface contacts which are accessible from the outside of a casing of the switching device, the diagnostic circuit being configured to short-circuit the third pair of interface contacts only when the main circuit is in a closed configuration with the front plate in the corresponding second end stroke position.

7. A switching device comprising at least one first terminal and at least one second terminal, at least one actuation unit comprising an electrovalve and an actuator which is integral with a contact plate which is able to move from a first position, in which it is in contact with both said at least one first terminal and said at least one second terminal thereby bringing them into electrical contact, to a second end stroke position, in which it is offset from said at least one first terminal and at least one second terminal, wherein said electrovalve is arranged to command said actuator thereby moving said contact plate between said first end stroke position and said second end stroke position, said at least one first terminal and at least one second terminal comprising retractable electrical contacts which are retractable within a respective housing against the action of an elastic element; wherein said first terminal, said second terminal and said contact plate define a main circuit, said switching device further comprising a diagnostic circuit designated to detect the correct opening and closing conditions of the main circuit; wherein said diagnostic circuit comprises a third pair of interface contacts which are accessible from the outside of a casing of the switching device, the diagnostic circuit being configured to short-circuit the third pair of interface contacts only when the main circuit is in a closed configuration with the front plate in the corresponding second end stroke position.

8. The switching device according to claim 7, wherein said front plate comprises at least one conductive portion which comes into contact with the third pair of interface contacts, thus short-circuiting it, when said front plate reaches the second end stroke position.

9. The switching device according to claim 8, wherein, during the movement of the front plate from a first end stroke position towards said second end stroke position, the contact plate reaches the retractable electrical contacts of the first and second terminals before the at least one conductive portion reaches the third pair of interface contacts.

* * * * *